United States Patent [19]

Vandas

[11] 4,246,884
[45] Jan. 27, 1981

[54] PLATE WARMER

[75] Inventor: Edward B. Vandas, St. Louis, Mo.

[73] Assignee: McGraw-Edison Company, Rolling Meadows, Ill.

[21] Appl. No.: 67,417

[22] Filed: Aug. 17, 1979

[51] Int. Cl.³ .............................................. A24G 23/04
[52] U.S. Cl. ..................................... 126/246; 126/375
[58] Field of Search ................ 126/246, 375, 400, 262; 220/23.83, 23.86, 68, 69; 206/4; 99/401, 447

[56] References Cited

U.S. PATENT DOCUMENTS 3,054,395   9/1962   Torino .................................. 126/246
3,837,330   9/1974   Lanigan ............................... 126/246

Primary Examiner—Samuel Scott
Assistant Examiner—Gerald A. Anderson
Attorney, Agent, or Firm—Ronald J. LaPorte; Jon Carl Gealow; Roy A. Ekstrand

[57] ABSTRACT

A plate warmer having a heat storing core material for releasing heat to food serving supported thereon dishware over an extended period of time, i.e., in excess of thirty minutes, and a method of making said plate warmer. The heat storing material comprises beads of synthetic petroleum wax which are compressed to form a solid core having inwardly concave top and bottom surfaces and to expel air from the core. Top and bottom outer plate members are compressed to conform to the inwardly concave surfaces of the core and then sealed to define an airtight, waterproof cavity which is filled by the core. When the plate warmer is heated, the core expands outwardly against the concave walls of the outer plate members and the walls assume a substantially flat configuration wherein the cavity is enlarged to accommodate the expanded core material, the walls reassuming their inwardly concave configuration as the heat storing core material cools and releases heat through the top outer plate member to the dishware.

9 Claims, 7 Drawing Figures

PLATE WARMER

BACKGROUND OF THE INVENTION

This invention relates generally to devices for keeping food serving dishware and food thereon warm prior to serving and, more particularly, to a heat storing plate warmer and a method for making said plate warmer.

Heat storing plates, or plate warmers, are commonly used in hotels institutional environments such as hospitals and nursing homes, and like operations to keep food warm prior to serving. Often the kitchen in such operations is far removed from the place where the food is served and consumed, and this, coupled with the large number of people to be served, frequently results in substantial delays between the time the food is removed from the oven and the time it is actually served. Such delays may, for example, commonly exceed thirty minutes by which time the food is cold. Accordingly, various plate warming devices for keeping food warm until it can be served, including several devices which are commercially available, have been suggested in the prior art.

One such device is disclosed in U.S. Pat. No. 3,557,774 wherein the device comprises a heat storage dish having an aluminum heat storage plate disposed in the space between the upper and lower walls of the dish. The metal heat storage plate is held against the bottom surface of the flat upper wall, and an insulating filler such as rock wool fills the remainder of the space between the heat storage plate and the bottom wall. In use, the heat storage dish is initially heated to store heat in the aluminum heat storage plate, and thereafter, when a plate of food is placed on the heat storage dish, the plate and the food are kept warm by the heat released from the heat storage plate. However, because air trapped in the space between the dish walls expands when the dish is heated, means must also be provided to relieve the internal pressure in the dish resulting from air expansion and thereby prevent the dish from bursting. Accordingly, the bottom wall of the heat storage dish shown in U.S. Pat. No. 3,557,774 includes an elevated annular wall portion which is deformable as the air in the space between the dish walls expands. One disadvantage of this dish, however, is that it requires a complex bottom wall having, in addition to the elevated annular wall portion, an outer circumferential reinforced support wall and a centrally disposed truncated conical wall portion extending upwardly from the annular wall portion through a central opening in the ring-shaped metal heat storage plate to attach to the top dish wall. Such an arrangement, of course, requires complicated fabrication and assembly and is not particularly suited for the mass production of such dishes.

The heat storage dish shown in U.S. Pat. No. 4,086,907 similarly utilizes a metal heat storage plate secured to the bottom surface of the flat top wall but eliminates the complex bottom wall described in the foregoing patent and substitutes indents or corrugations in the concave bottom plate wall which permit expansion or deformation of the bottom wall to prevent the dish from bursting should the plate be overheated. Because of the concave configuration of the base portion, however, the base itself provides substantial resistance to such expansion under normal conditions and makes the bottom of the plate relatively strong. This dish also suffers the disadvantage of requiring relatively complicated fabrication and assembly in that channel members extending through slots in the metal heat storage plate are spot welded to the top wall to secure the metal plate against the bottom side of the top wall. Moreover, such spot welds are also susceptible to breakage due to heat stress over continued periods of usage.

Another disadvantage of such dishes wherein metal heat storage plates are utilized is that because of the relatively high thermal conductivity of metals such as aluminum, the heat storage plate, when heated to a relatively low temperature, for example, 230° F., is limited with respect to the amount of time it is effective to keep food warm. Although the heat storing dish may be initially heated to a relatively high temperature, i.e., in excess of 350° F., to store sufficient energy in the metal heat storage plate to keep food warm for an appreciable period of time, this, of course, increases the inherent risk in handling such dishes and may cause the dish to burst. Also, while the heat storage plate can be increased in size to store more heat, the physical size and weight limitations for devices of this type generally do not permit increasing the size of the heat storage plate.

U.S. Pat. No. 3,148,676, on the other hand, discloses a food warming unit wherein the metal heat storage plate is replaced by a wax or asphalt substance having a relatively high specific heat and a relatively low melting point, e.g., between 180° and 270° F. The substance, which may comprise, for example, a wax such as carnauba wax, Cornox wax or a synthetic hardened microcrystalline wax, stores a relatively large amount of heat energy which is gradually released at a rate which is much less than the rate at which it was stored. The substance fills a chamber between the top and bottom walls of the unit and is retained within a honeycomb framework which is fabricated from aluminum or the like to form a multiplicity of relatively small, closely spaced cavities in the chamber. In this particular unit, expansion of the substance is accommodated by a pair of spaced circular lines of weakness in the annular recessed portion of the top wall which provide relief means for preventing the unit from bursting in the event that excess pressure is developed in the chamber. This unit, as do to the first two heat storage dishes described, also requires relatively complicated fabrication and assembly.

Further, fabrication of units utilizing heat storing substances, such as those disclosed in U.S. Pat. No. 3,148,676, is difficult because the heat storing substance is not readily insertable into the unit in its solidified state where, for example, a honeycomb framework or the like is required. If the substance is first melted for insertion into the honeycomb framework, the substance must be allowed to cool before further fabrication or assembly can be undertaken, and because one advantage of the heat storing substance is its capacity for heat retention for long periods of time, it is some time before the substance has cooled sufficiently to permit further work. Moreover, if the melted substance is injected into the device, the injection hole must be sealed, such as by soldering, and if the hole is improperly sealed, the seal may rupture due to expansion of the heat storing substance during use, allowing the substance to leak from device or allowing water or air to migrate into the chamber. In either case, mass production of such units is severely restricted.

Ideally, such devices should require only simplified fabrication and assembly, be low cost, and be effective to keep food warm for extended periods of time, i.e., more than thirty minutes. It is also desirable to provide such a unit wherein the walls of the unit do not have corrugations or the like, do not have complex surfaces, and are not weakened to provide pressure relief means.

Other heating devices similar to those discussed herein, but less relevant, are disclosed in the following U.S. Pat. Nos.: 780,352; 1,412,717; 2,640,478; 2,690,743; 2,791,204; 2,876,634; 3,164,148; 3,463,140; and 3,603,106.

SUMMARY OF THE INVENTION

The plate warmer of the present invention, including the method of making said plate warmer, obviates the aforementioned disadvantages of prior heat storing plate warmer devices and the methods of making such devices and provides a plate warmer which is more easily fabricated and assembled and which maintains a significant heat output for a longer period of time than possible with devices heretofore available.

More particularly, the present invention discloses a plate warmer comprising an outer shell having an inwardly concave top wall and an opposing inwardly concave bottom wall joined to the top wall by an interconnecting peripheral side wall. The walls of the outer shell define an airtight, waterproof cavity containing a core comprising a heat storing material having a relatively high specific heat, a relatively high heat of fusion, and a relatively low melting temperature. In one embodiment, the heat storing material comprises a synthetic petroleum wax having a specific heat of at least 0.5 Btu, a heat of fusion of at least 50 calories/gram, and a melting temperature in the range between about 185° F. and about 240° F., and preferrably about 215° F. The core initially comprises particles (e.g., beads, flakes, or the like) of heat storing material which have been compressed to expel substantially all air from the core and to provide inwardly concave top and bottom core surfaces to which the top and bottom shell walls conform such that the core fills the cavity. The top and bottom outer shell walls are adapted to assume substantially flat configurations to accommodate expansion of the core material when the core is heated and to reassume their inwardly concave configurations when the core is cool. In use, the plate warmer is heated to melt the core and store heat therein and then allowed to cool to usefully release heat therefrom to food serving dishware as the heat storing material cools below the melting temperature of the material, heat from the core being transferred through the top outer shell wall to food serving dishware supported thereon to keep food on the dishware warm for an extended period of time.

Another aspect of the present invention comprises a method for fabricating the subject plate warmer. The method includes initially forming both a top outer shell member having a peripheral rim and a complementary bottom outer shell member having an outer rim for engaging the outer rim of the top outer shell member. The heat storing core is separately formed from the aforesaid beads of synthetic petroleum wax by filling the female member of a compression mold having an inwardly directed concave molding surface with the beads of heat storing material and then applying a compressive force on the beads with a complementary male compression mold member having an inwardly directed concave molding surface. The core of heat storing material thus formed with inwardly concave top and bottom surfaces is then placed between the top outer shell member and the complementary bottom shell member, and a compressive force is applied to the top and bottom outer shell members such that the outer shell members assume the inwardly concave configuration of the core, the core filling the space between the top and bottom shell members. Thereafter, the rim of the top outer shell member is secured to the rim of the bottom outer shell member in an airtight, waterproof manner to seal the core in the space between the top and bottom outer shell members, the method of securing the rims taking, for example, the form of welding or inductive brazing.

BRIEF DESCRIPTION OF THE DRAWINGS

The features of this invention which are believed to be novel are set forth with particularity in the appended claims. The invention, together with its further objects and the advantages thereof, may be best understood, however, by reference to the following description taken in conjunction with the accompanying drawings, in which like reference numerals identify like elements in the several figures and in which:

DETAILED DESCRIPTION

Figure 1:
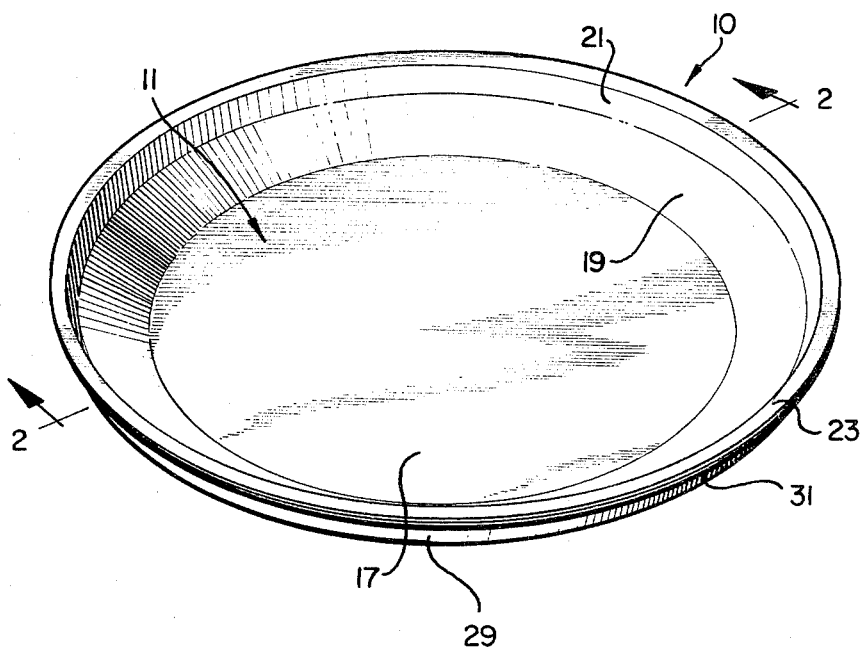
FIG. 1 is perspective view of the plate warmer of the present invention.
Figure 2:
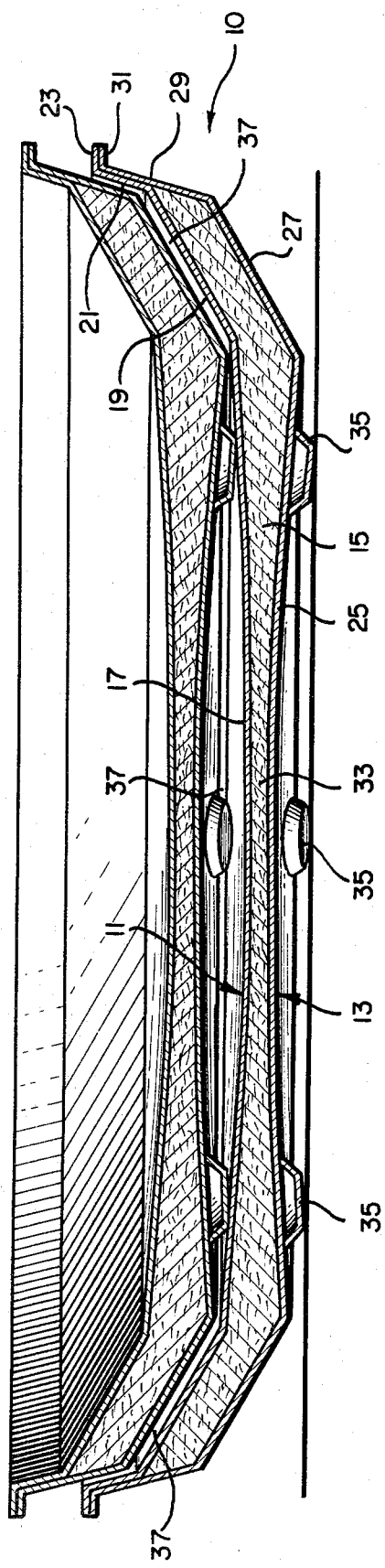
FIG. 2 is a sectional view illustrating two of the subject plate warmers in stacked relation and showing the configuration of the core and the outer shell when the plate warmers are cool, the sectional view corresponding to that which would be viewed along lines 2—2 in FIG. 1.
Figure 3:
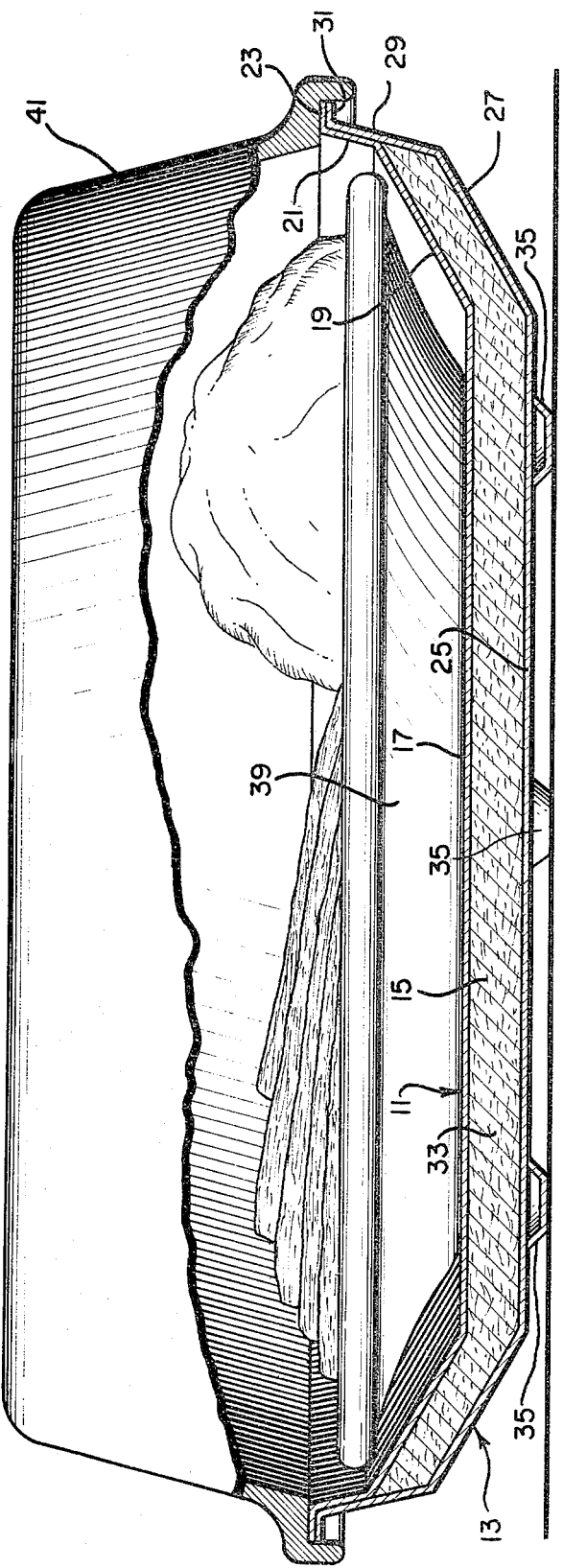
FIG. 3 is the sectional view of FIG. 2 showing the configuration of the core and the outer shell of a single plate warmer with an insulating cover thereon when the plate warmer has been heated above the melting point temperature of the heat storing material.

Referring now to FIGS. 1–3 of the drawings, the plate warmer of the present invention, identified generally by reference numeral 10, is seen to generally comprise a top outer shell member 11 and a bottom outer shell member 13 combining to form a circular or dish-shaped outer shell and an internal core 15 formed from a heat storing material having a relatively high specific heat, a relatively high heat of fusion, and a relatively low melting temperature.

More particularly, the top shell member 11, a unitary piece fabricated, for example, from a sheet of stainless steel and having a centrally disposed, circular wall portion 17 on which dishware such as a plate is supported during use, flared circumferential side wall portions 19 and 21 extending generally upwardly and outwardly from the centrally disposed wall portion, and a peripheral rim portion 23 at the outer edge thereof. The complementary bottom shell member 13 is similarly fabricated as a single piece from stainless steel or the like and includes a centrally disposed wall portion 25, 27 and 29 and a peripheral rim portion 31. When assembled, the flared wall portions 21 and 29 and the rims 23 and 31 of the top and bottom shell members 11 and 13, respectively, are juxtaposed, and the rims 23 and 31 are welded, inductively brazed, or similarly secured to fasten the top and bottom shell members together and seal the shell along its peripheral edge, the flared wall portions 19 and 27 and the central wall portions 17 and 25 being spaced apart to provide an interior airtight, waterproof cavity, identified generally by reference numeral 33.

The heat storing core 15 fills the entire cavity 33 and serves to store heat when the plate warmer is initially heated and then release the stored heat through the top shell member 11 for an extended period of time as the plate warmer is allowed to cool. The heat storing material comprising the core is preferably a synthetic petroleum wax material having a specific heat of at least 0.5 Btu, a heat of fusion of at least 50 calories/gram and a melting temperature in the range between 185° F. and about 240° F. The material should also be non-toxic. When the core material is heated above its melting temperature, a relatively large amount of heat, i.e., heat of fusion, is stored therein as the heat storing material melts from its solid state to its liquid state. Thereafter, when the heat storing material is allowed to cool, the material undergoes a phase change from the liquid state to the solid state, and the heat energy stored in the material is gradually released at a rate which is much less than the rate at which it was stored. Thus, a substantial amount of heat is available for release to the dishware to keep the food thereon warm for a relatively long period of time, i.e., in excess of thirty minutes. One such synthetic petroleum wax material is Bareco ®655 Polywax, a low-molecular-weight homopolymer of ethylene manufactured by the Bareco Division of Petrolite Corporation, Tulsa, Okla., such material being an expecially effective heat storing substance and providing much greater heat storing capabilities than metal heat storage plates and the like. This material has a melting temperature of about 215° F., a specific heat of at least 0.5 Btu and a heat of fusion of about 55 calories/gram. Also, when heated above its melting point, this material exhibits an expansion of about twenty percent.

In accordance with one aspect of the present invention, the centrally disposed top and bottom wall portions 17 and 25 of the outer shell are concave and extend inwardly into the cavity 33 in opposing directions. The outer shell members 11 and 13 are fabricated from relatively thin stainless steel sheet material and, thus, are sufficiently flexible to react to the expansion of the core 15 and move outwardly to accomodate the expanded heat storing core material when the plate warmer is heated. That is, as the heat storing material is heated, the core 15 expands, forcing the concave walls 17 and 25 apart such that the walls assume a substantially flat, horizontal configuration, and therefore, additional pressure relief means is not required. Thereafter, as the heat storing material cools and releases heat to the dishware through the top shell wall 11, the core 15 contracts and the top and bottom shell members 11 and 13 reassume their respective concave configurations.

In use, several plate warmers 10 may be stacked in an oven or other heating means and heated to a temperature above the melting point of the heat storing material, preferably to about 230° F. when the heat storing material used is Bareco ®655 Polywax. To ensure that each plate warmer is uniformly heated such that the core 15 melts, the plate warmers 10, as illustrated in FIG. 2, are stacked in spaced apart relation to permit convective air flow between the plate warmers. To this end, feet 35 are provided on and extend from the bottom surface of the bottom shell member 13 near the outer periphery of the centrally disposed concave wall portion 25 to support each plate warmer above the underlying plate warmer and provide an air space 37 for convective air flow between adjacent plate warmers. After the plate warmer is heated sufficiently to melt the core, the plate warmer is removed from the heating oven and a plate 39 having warm food thereon is placed on the plate warmer as shown in FIG. 3. An insulating cover 41 is then preferably placed on the plate warmer 10 to retain the heat from the plate warmer within the cover and thus help keep the food warm.

Figure 4:
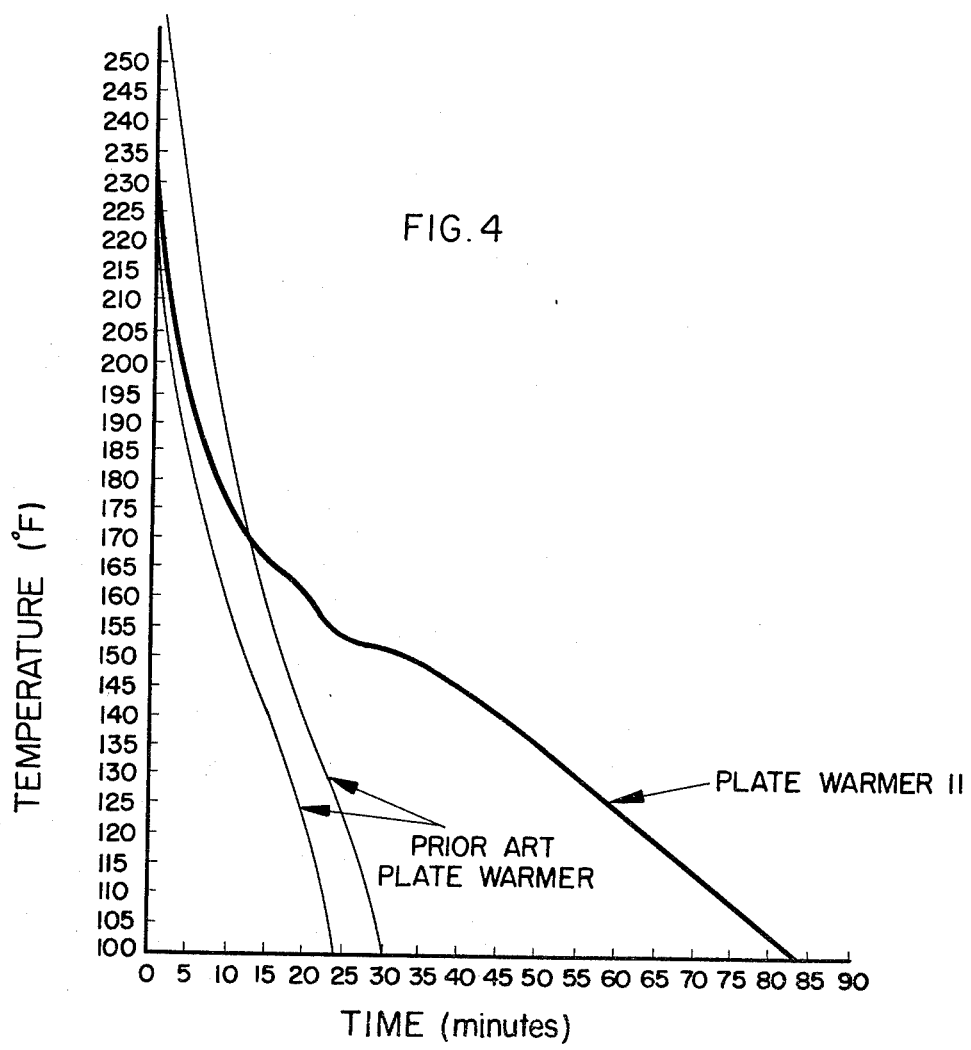
FIG. 4 is a graph showing the improved heating characteristics of the plate warmer of the present invention compared to those of a commercially available prior art device.

As illustrated in FIG. 4, one advantage of the plate warmer of the present invention is that it releases heat to the dishware over a extended period of time, i.e., in excess of thirty minutes. In one particular embodiment of the subject plate warmer, the outer shell members 11 and 13 are fabricated from twenty gauge stainless steel sheet material, and the plate warmer has an outside diameter of about nine and one-half inches in order to accommodate a plate having a diameter of nine inches. The heat storing core 15 is formed from compressed beads of Bareco ®655 Polywax synthetic petroleum wax. When the plate warmer is cool, the shell walls 17 and 25 are concave, and the core 15 is approximately 0.175 inches thick at the center of the plate warmer and approximately 0.375 inches thick at the radius of about 3.55 inches from the center where the wall portions 17 and 25 meet the flared wall portions 19 and 27, respectively. When heated, the core material expands the walls 17 and 25 outwardly to a flat configuration such that the spacing between walls 17 and 25 filled by the heat storing material is uniformly about 0.375 inches thick. Tests that have been conducted on this particular embodiment show that the subject plate warmer delivers heat for a period of time which is substantially longer than can be provided by other commercially available prior art units. In comparing the subject plate warmer with a well-known commercially available unit having a metal heat storage plate, both plate warmers were initially heated to a temperature of 230° F. and allowed to cool. The temperatures of both plate warmers were recorded by means of a thermocouple held to the plate under thumb pressure and were taken on the open face of the plate warmers without covers and without dishware being present on the plate warmers. In FIG. 4, it can be seen that the surface of the prior art device cooled to a temperature of about 140° F. after fifteen minutes whereas the surface of the plate warmer of the present invention did not cool to that temperature until forty-five minutes had elapsed, a 300% improvement. Moreover, even when the prior art device was initially heated above 250° F., the subject plate warmer exhibited substantially better heating characteristics.

In accordance with another aspect of the present invention, the method of fabricating the subject plate warmer hereinafter described is more economical in terms of materials, labor and time than methods of fabricating prior art devices.

Figure 5:
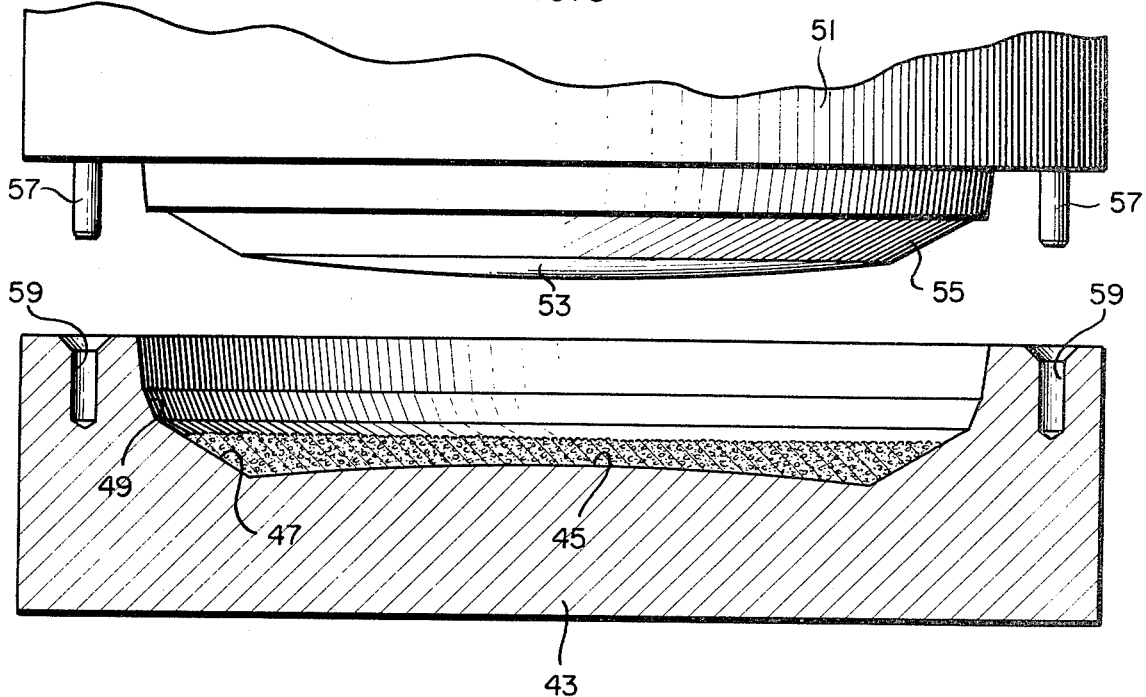
FIG. 5 is a side elevational view, partly in section, showing the beads of heat storing material in the female member of the compression mold before the male compression mold member and the female compression mold member cooperate to compress the heat storing material and form the core.
Figure 6:
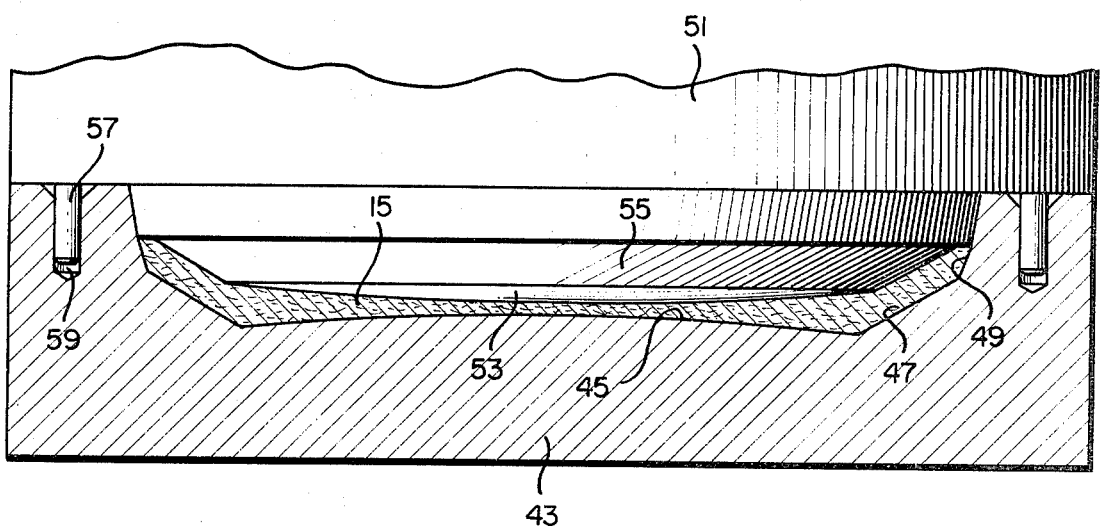
FIG. 6 is a side elevational view, partly in section, showing the compression mold in an operative position for compressing the beads of heat storing material into the solid core member.
Figure 7:
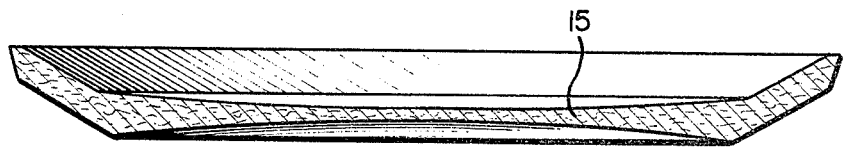
FIG. 7 is a sectional view of the heat storing core formed by the compression mold.

More particularly, the preferred heat storing material, i.e., Barceo ®655 Polywax, is available in bulk in the form of small, individual beads, and as illustrated in FIGS. 5-7, the method of the present invention utilizes a compression mold for compressing the beads of heat storing material into a solid core 15. One compression mold that may be used comprises a female mold member 43 having an inwardly concave molding surface 45 and flared peripheral side wall molding surfaces, 47 and 49, and a complementary male compression member 51 having an opposing inwardly concave molding surface 53 and a flared peripheral side wall molding surface 55. Alignment pins 57 or similar means extend from the male compression member 51 to engage corresponding alignment pin receptacles 59 in the female member 43. When the female and male members, 43 and 51, respectively, are moved into compressive engagement, the male mold member 51 enters the female mold member 43 to compress the beads of heat storing material therebetween. Since compression of the material occurs first at the center of the opposed concave molding surfaces 45 and 53, as the material is compressed to form the solid core member 15, substantially all of the air between the beads of heat storing material is expelled outward radially from the center of the mold, thus providing a solid core of heat storing material.

The core 15 is then placed between the top outer shell member 11 and the bottom shell member 13 which are preformed by stamping from twenty gauge stainless steel sheet stock. When initially formed, the centrally disposed walls 17 and 25 of the shell members are flat, but the flared wall portions 19, 21, 27, 29 and the rims 23 and 31 are provided. A compressive force is then applied to the outer shell members 11 and 13 to deform the centrally disposed walls 17 and 25 such that these walls assume the inwardly concave configuration of the core 15, and the core fills the space or cavity 33 between the outer shell members. During this step, substantially all air is expelled from the cavity.

Finally, the rims 23 and 31 of the top and bottom shell members are sealed together to secure the core 15 in the cavity 33 in an airtight, waterproof enviroment. The sealing operation may comprise, for example, welding or inductively brazing the rims together to prevent the migration of the heat storing core material from the cavity and also prevent leakage of air or moisture into the cavity.

Accordingly, the method of fabricating the plate warmer herein disclosed provides a plate warmer which is easier and more economical to fabricate and which delivers heat to food serving dishware for a substantially longer period of time than prior heat storage devices heretofore suggested.

While a particular embodiment of the present invention has been shown and described, it will be obvious to those skilled in the art that various changes and modifications may be made without departing from the invention in its broader aspects. Accordingly, the aim in the appended claims is to cover all such changes and modifications which may fall within the true spirit and scope of the invention.

What is claimed is:

1. A plate warmer for keeping food serving dishware warm for an extended period of time, said plate warmer comprising:

an outer shell having an inwardly concave top wall, an inwardly concave bottom wall and peripheral sides wall interconnecting said top and bottom walls, said walls defining an airtight cavity within said shell; and a core comprising a heat storing material having a relatively high specific heat, a relatively high heat of fusion, and a relatively low melting temperature, said core initially comprising beads of heat storing material which have been compressed to expel substantially all air therefrom and to provide inwardly concave top and bottom core surfaces conforming to said top and bottom shell walls, said core filling said airtight cavity and being meltable to store heat therein when heated toward and above the melting temperature of said heat storing material and to release heat through said top shell wall to said dishware as said heat storing material cools, said top and bottom shell walls being adapted to assume substantially flat configurations to accommodate expansion of said core as said core is heated and to reassume said inwardly concave configurations as said core cools.

2. A plate warmer in accordance with claim 1 wherein said heat storing core material comprises a synthetic petroleum wax having a specific heat of at least 0.5 Btu, a heat of fusion of at least 50 calories/gram, and a melting temperature between about 185° F. and about 240° F.

3. A plate warmer in accordance with claim 2 wherein said heat storing core material comprises a synthetic petroleum wax having a specific heat of at least 0.5 Btu, a heat of fusion of about 55 calories/gram, and a melting temperature of about 215° F.

4. A plate warmer in accordance with claim 1, 2 or 3 wherein said synthetic petroleum wax comprises a low-molecular-weight homopolymer of ethylene.

5. A method for making a plate warmer, said method comprising:

forming a top outer shell member having a peripheral outer rim;

forming a complementary bottom outer shell member having a peripheral outer rim for engaging the outer rim of the top outer shell member;

forming a core of heating storing material having inwardly concave top and bottom surfaces;

placing the core between the top outer shell member and the complementary bottom outer shell member;

applying a compressive force to the top and bottom outer shell members such that the outer shell members engage to define a cavity therebetween and assume the inwardly concave configuration of the top and bottom surfaces of the core, the core filling the cavity between the top and bottom outer shell members; and securing the rim of the top outer shell member to the rim of the bottom outer shell member in an airtight manner to seal the core in the cavity between the top and bottom outer shell members.

6. A method in accordance with claim 5 wherein the heat storing material initially comprises beads of heat storing material and the step of forming the core comprises filling the female member of a compression mold having an inwardly directed concave molding surface with the beads of heat storing material and applying a compressive force on said beads with a complementary male compression mold member having an inwardly directed concave molding surface to form the core and expel air therefrom.

7. A method in accordance with claim 6 wherein the heat storing material initially comprises beads of synthetic petroleum wax.

8. A method in accordance with claim 5 or 6 wherein the step of securing the rims of the top and bottom outer shell members comprises welding the rims together.

9. A method in accordance with claim 5 or 6 wherein the step of securing the rims of the top and bottom outer shell members comprises inductively brazing the rims together.

* * * * *